US007693293B2

(12) United States Patent
Nemoto et al.

(10) Patent No.: US 7,693,293 B2
(45) Date of Patent: Apr. 6, 2010

(54) SOUND PROCESSING DEVICE AND INPUT SOUND PROCESSING METHOD

(75) Inventors: Miyako Nemoto, Tokyo (JP); Satoshi Hosokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1258 days.

(21) Appl. No.: 11/211,741

(22) Filed: Aug. 26, 2005

(65) Prior Publication Data

US 2006/0050895 A1 Mar. 9, 2006

(30) Foreign Application Priority Data

Aug. 27, 2004 (JP) ............................ 2004-248540

(51) Int. Cl.
*H04B 15/00* (2006.01)

(52) U.S. Cl. .................... 381/94.5; 381/94.1; 381/94.2; 381/94.3; 704/226

(58) Field of Classification Search ....... 381/94.1–94.3, 381/94.5, 94.7; 700/94; 704/226
See application file for complete search history.

(56) References Cited

U.S. PATENT DOCUMENTS 5,930,372 A * 7/1999 Kuriyama .................. 381/71.9
6,320,918 B1 11/2001 Walker et al.
6,578,162 B1 * 6/2003 Yung .......................... 714/708
7,024,004 B2 * 4/2006 Nishiyama ................ 381/94.5
2001/0031650 A1 10/2001 Baiker et al.

FOREIGN PATENT DOCUMENTS

| | | |
|---|---|---|
| EP | 0 622 724 | 11/1994 |
| EP | 1 349 149 | 10/2003 |
| JP | 60-173600 | 9/1985 |
| JP | P3420831 | 4/2003 |

* cited by examiner

*Primary Examiner*—Xu Mei
*Assistant Examiner*—Disler Paul
(74) *Attorney, Agent, or Firm*—Whitham Curtis Christofferson & Cook, PC

(57) ABSTRACT

Provided is a sound processing device including: a sound input unit for dividing an input sound into predetermined time units; a sound processing unit for encoding the input sound thus divided; a noise detecting unit; and an output control unit for replacing encoded data on the input sound with silent data according to detection results of the noise detecting unit. Also provided is an input sound processing method including: encoding an input sound; judging whether or not the input sound contains a noise; and replacing a noise portion contained in the encoded input sound with silent data.

20 Claims, 6 Drawing Sheets

SOUND PROCESSING DEVICE AND INPUT SOUND PROCESSING METHOD

BACKGROUND OF THE INVENTION

1. Field of the Invention

The present invention relates to a sound processing device and a method therefor, and more particularly to a sound processing device for canceling an input noise, a method therefor, and a computer program product therefor.

2. Description of the Related Art

In an electronic device such as a microphone having an audio input unit, various noises alone or along with a desired audio may be inputted into the audio input unit. The various noises include a noise generated due to an operation of the electronic device. In a portable communication device such as a cellular phone, a microphone is disposed in the vicinity of a key operation unit. Therefore, a sound generated due to a key operation may be inputted into the microphone and sent to a communication counterpart.

For example, JP 3,420,831 B and JP 60-173600 A each disclose a method of suppressing and canceling a noise inputted through a microphone. Other known methods include a method of extracting a noise from an inputted sound and generating a sound wave having an inverse phase to the noise, thereby suppressing the noise.

However, know noise canceling processings increase a processing time required for a sound data processing. In other words, the sound data processing delays by a time required for the noise canceling processing.

SUMMARY OF THE INVENTION

It is an object of the present invention to provide a sound processing device capable of reducing a processing time required for a sound data processing accompanied by a noise canceling processing, and a method therefor.

In order to achieve the above object, according to an aspect of the present invention, there is provided a sound processing device including: input sound dividing means for dividing an input sound into predetermined time units; input sound encoding means for encoding the input sound thus divided; noise detecting means; and output control means for replacing encoded data on the input sound with silent data according to detection results of the noise detecting means.

According to another aspect of the present invention, there is provided a sound processing device including: a sound input unit for dividing an input sound into predetermined time units; a sound processing unit for encoding the input sound thus divided; a noise detecting unit; and an output control unit for replacing encoded data on the input sound with silent data according to detection results of the noise detecting unit.

According to further another aspect of the present invention, there is provided an input sound processing method including: encoding an input sound; judging whether or not the input sound contains a noise; and replacing a noise portion contained in the encoded input sound with silent data.

According to still another aspect of the present invention, there is provided a computer program product in a computer readable medium for use in a sound processing device, the computer program product including the steps of: encoding an input sound; judging whether or not the input sound contains a noise; and replacing a noise portion contained in the encoded input sound with silent data.

According to the present invention as described above, even execution of the noise canceling processing does not increase a time required for a sound data processing, unlike conventional techniques.

BRIEF DESCRIPTION OF THE DRAWINGS

The above and other objects, features and advantages of the present invention will become apparent form the following detailed description when taken with the accompanying drawings in which.

DETAILED DESCRIPTION OF THE PREFERRED EMBODIMENTS

Figure 1:
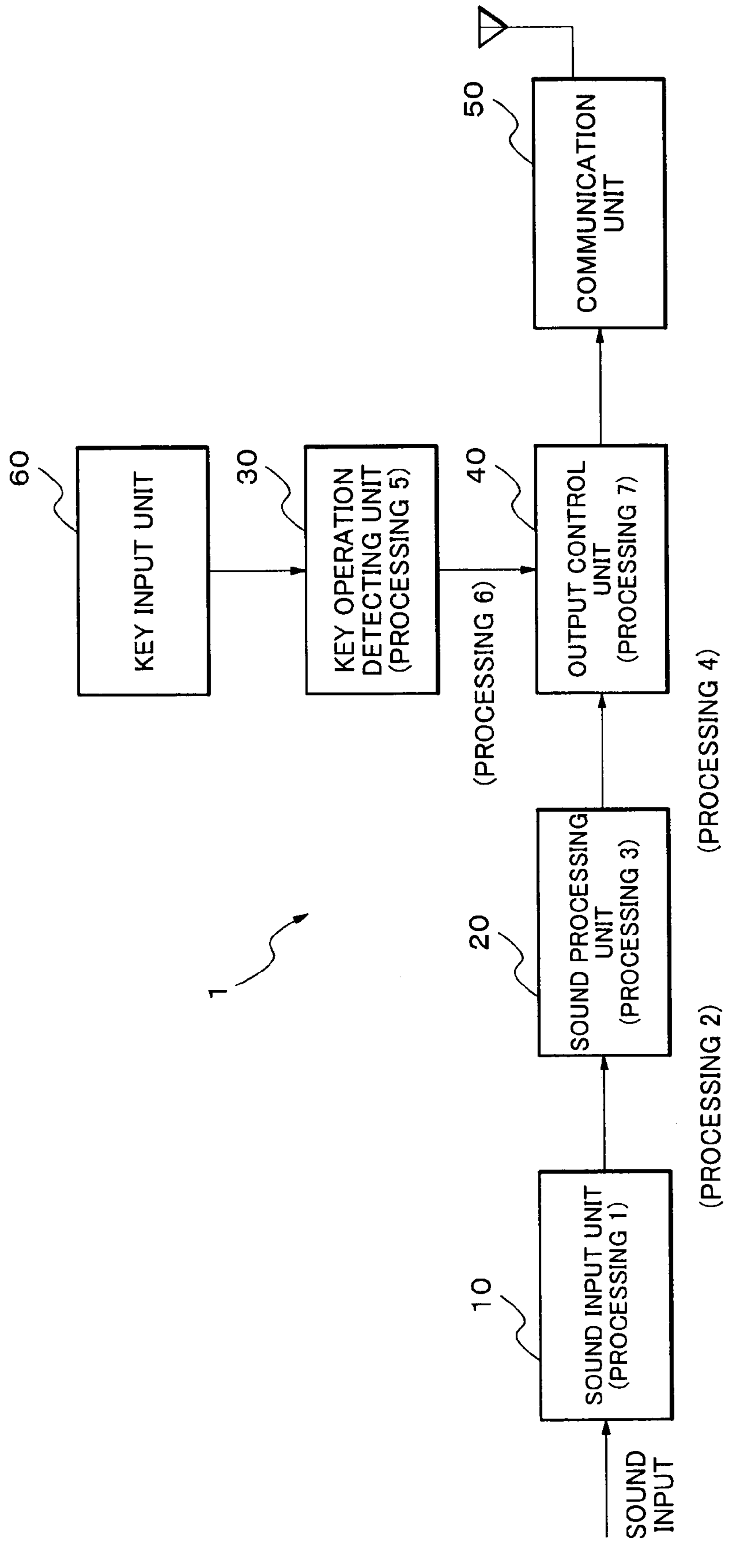
FIG. 1 is a block diagram of an example in which a sound processing device according to an embodiment of the present invention is applied to a portable communication terminal.

Hereinafter, description will be made on a sound processing device according to preferred embodiments of the present invention. FIG. 1 shows an example in which a sound processing device 1 according to an exemplary embodiment of the present invention is applied to a portable communication terminal such as a cellular phone. The sound processing device 1 includes a sound input unit 10, a sound processing unit 20, a key operation detecting unit 30, and an output control unit 40. A communication unit 50 and a key input unit 60 are structural components of the portable communication terminal. The sound input unit 10 divides input audio data into predetermined time units called frames (processing 1) and sends the frames to the sound processing unit 20 (processing 2). The sound processing unit 20 encodes the frames received from the sound input unit 10 (processing 3) and sends the frames to the output control unit 40 (processing 4). The key operation detecting unit 30 detects a key operation through the key input unit 60 (processing 5) and notifies the output control unit 40 of the detection results (processing 6). In other words, the key operation detecting unit 30 is a kind of noise detecting unit. The sound processing device 1 recognizes that a noise is being inputted to the sound input unit 10 due to the key operation. Based on the detection results sent from the key operation detecting unit 30, the output control unit 40 selects an encoded data frame received from the sound processing unit 20 or a silent frame encoded in advance by the output control unit 40 (processing 7). To be specific, when the key operation detecting unit 30 detects the key operation, the output control unit 40 replaces the encoded data frame with the silent frame and sends the silent frame to the communication unit 50. When the key operation detecting unit 30 does not detect the key operation, the output control unit 40 sends the encoded data frame to the communication unit 50.

Figure 2:
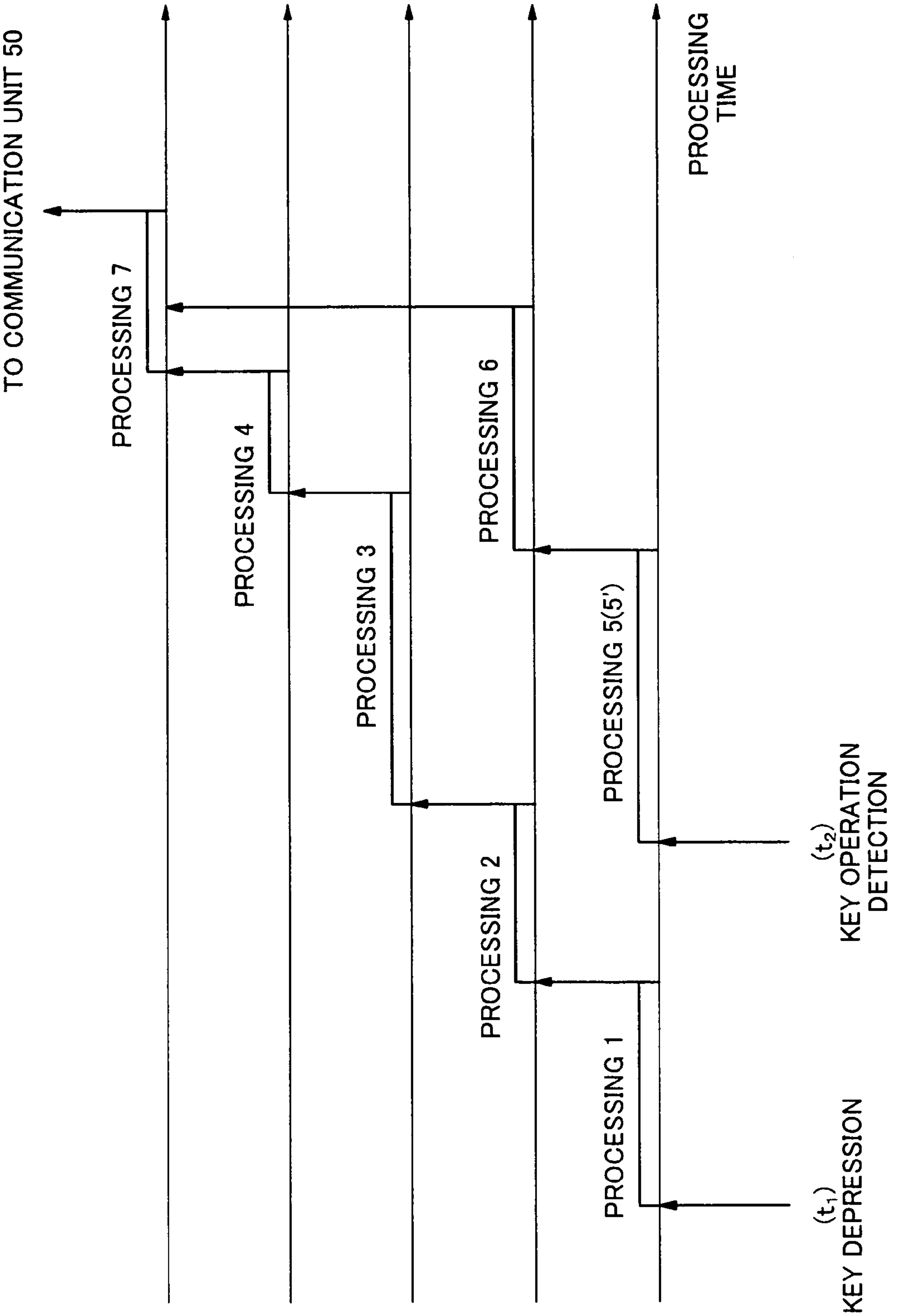
FIG. 2 shows processing times for processings within a sound processing device according to the embodiment shown in FIG. 1.

FIG. 2 shows processing times for processings within the sound processing device 1. When an input key (that is, key input unit 60) of the portable communication terminal is operated, a noise such as a key click sound is inputted to the sound input unit 10 at time t1. The key operation detecting unit 30 electrically detects an operation such as key depression (processing 5). The key operation detecting unit 30 detects the key operation at time t2, or after a lapse of a predetermined time from the noise generation. However, a time required for the processings (processings 5 and 6) at the key operation detecting unit 30 is generally shorter than a time required for the processings (processings 1 to 4) at the sound input unit 10 and the sound processing unit 20. Accordingly, an input sound encoding processing and a noise (i.e. key operation sound) detecting processing are performed in parallel. The encoded data frame and the key operation detection results reach the output control unit 40 substantially at the same time. Therefore, the time required for processing an input sound is prevented from being longer due to the noise detection/canceling processing. In addition, it is unnecessary to detect a noise generated due to key depression from among input sound signals, thereby realizing a simple sound processing device and a method therefor.

Figure 3:
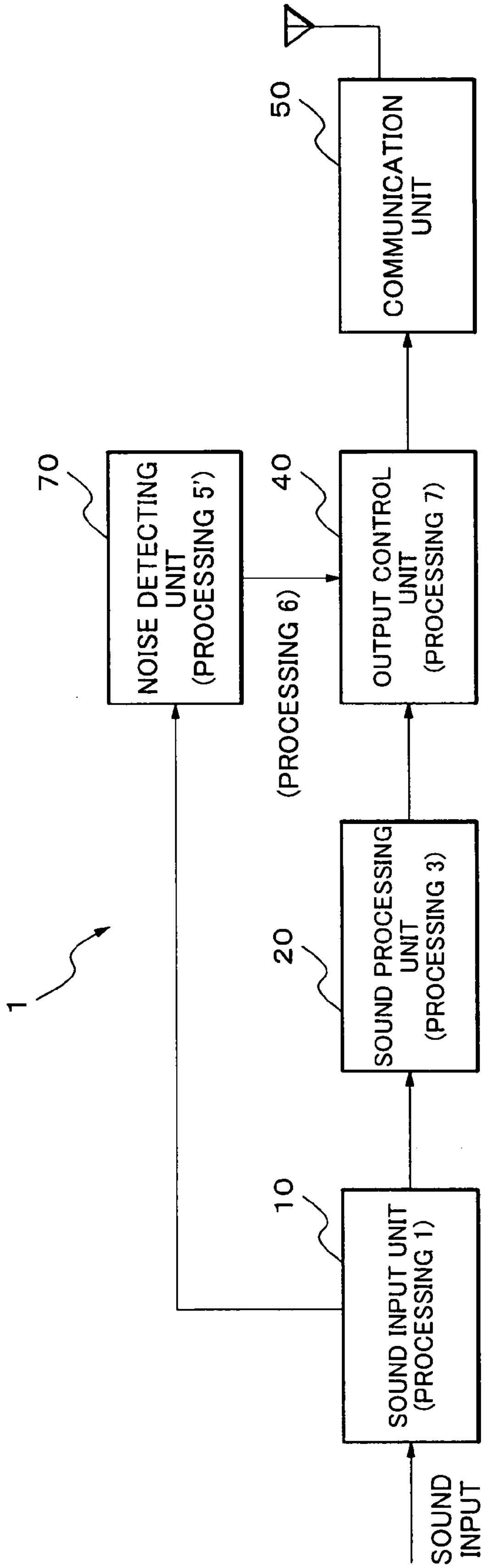
FIG. 3 is a block diagram of a sound processing device according to another embodiment of the present invention.

FIG. 3 shows a sound processing device according to another exemplary embodiment of the present invention. The sound processing device 1 has a noise detecting unit 70 replacing the key operation detecting unit 30. The noise detecting unit 70 performs noise detection from an input sound through a known sound processing (processing 5'). Similarly to the above-mentioned embodiment, the sound input unit 10 converts an input sound into frames and sends the frames to the sound processing unit 20 and the noise detecting unit 70. Accordingly, the noise detecting processing and the sound encoding processing are performed in parallel and independently of each other. Those processings require substantially the same time. Upon reception of noise detection from the noise detecting unit 70, similarly to the above-mentioned embodiment, the output control unit 40 replaces an encoded data frame (noise frame) of the input sound with a silent frame. Also in this exemplary embodiment, the time required for processing an input sound is prevented from being longer due to the noise detection processing.

Figure 4:
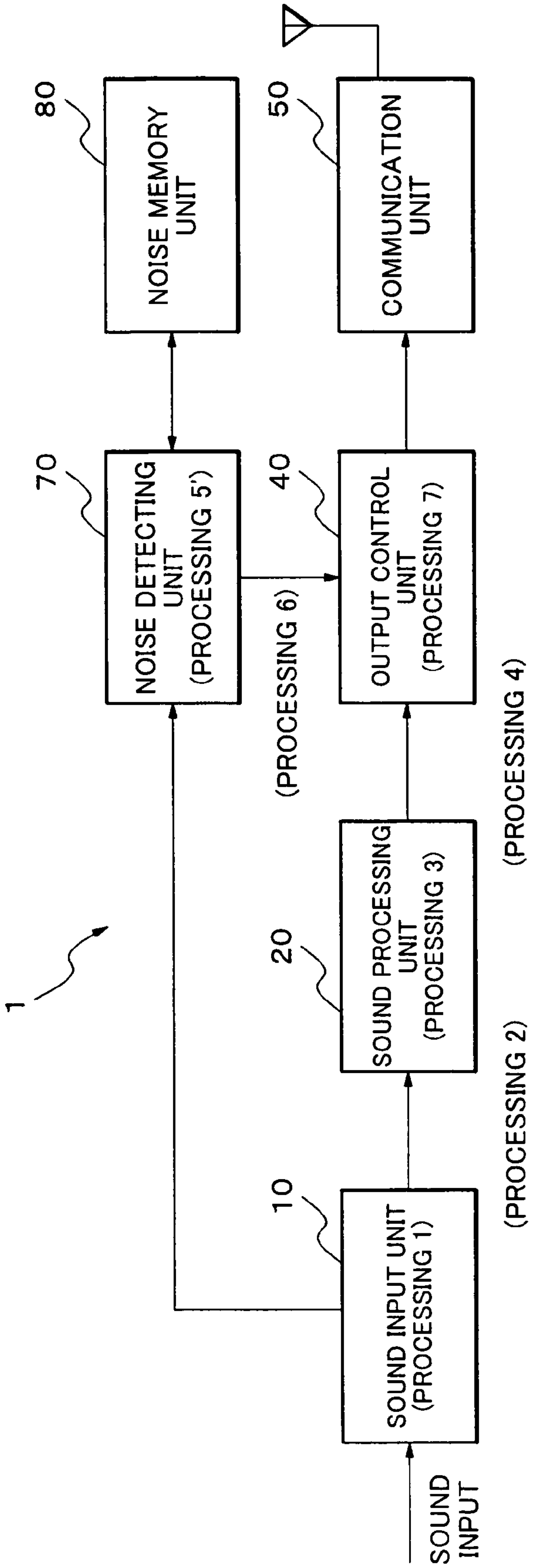
FIG. 4 is a block diagram of a sound processing device according to further another embodiment of the present invention.

FIG. 4 shows a sound processing device according to further another exemplary embodiment of the present invention. In the sound processing device 1 shown in FIG. 4, a noise memory unit 80 is added to the sound processing device 1 shown in FIG. 3. The noise memory unit 80 holds data on various key click sounds generated through an input key. By referencing the data, the noise detecting unit 70 can detect a noise with ease and in a short time. The noise memory unit 80 can hold data on a noise detected by the noise detecting unit 70. In addition, it is possible to collect various key click sounds by operating keys in advance and to store the sounds in the noise memory unit 80. Also in this embodiment, processings 1 to 4, 5', 6, and 7 are the same as those of the embodiments shown in FIGS. 1 and 3. The noise memory unit 80 allows the sound processing device 1 to further reduce the time required for a sound data processing.

Figure 5:
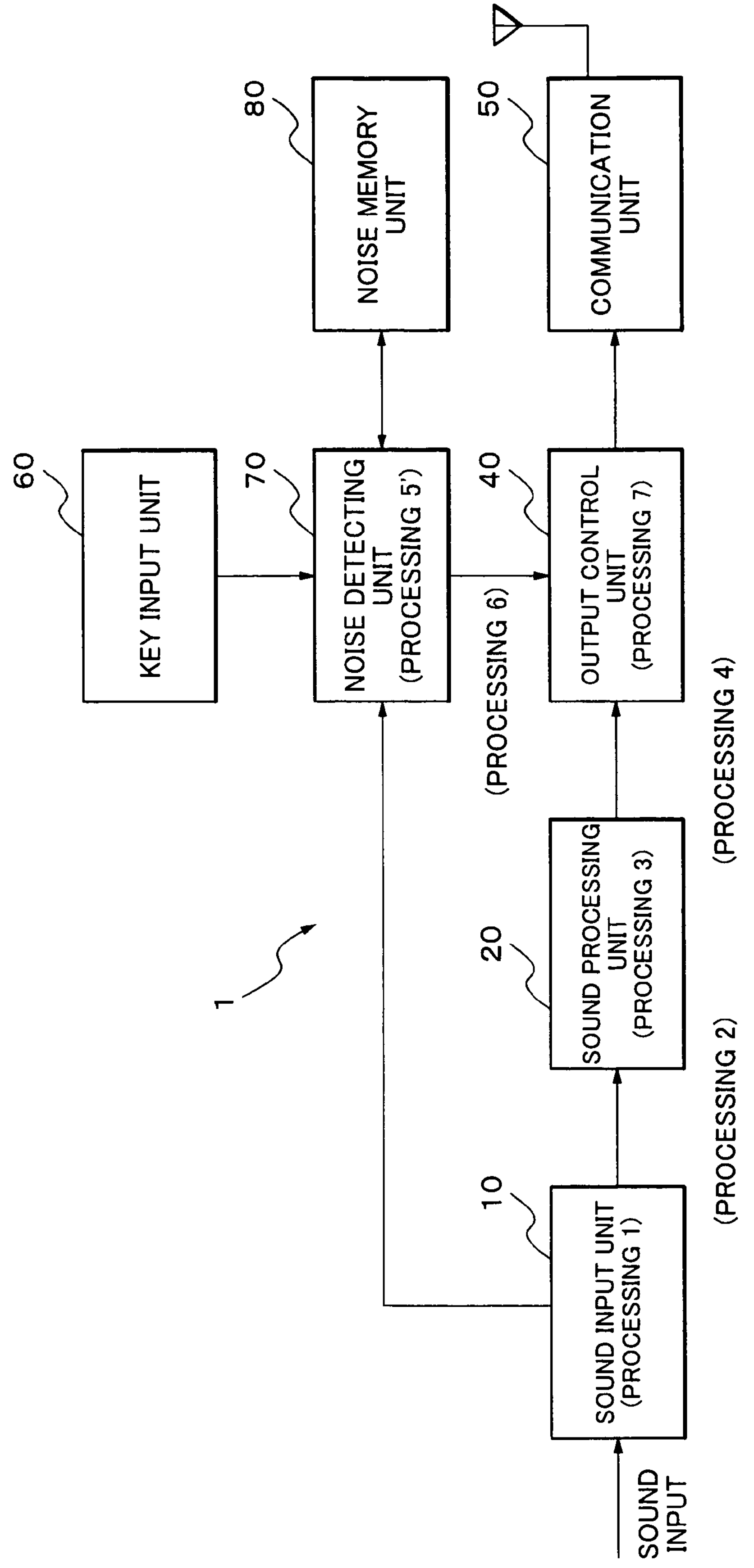
FIG. 5 is a block diagram of a sound processing device according to still another embodiment of the present invention.

FIG. 5 shows a sound processing device according to still another exemplary embodiment. Upon detection of an input key (key input unit 60) operation and upon detection of a noise among input sound data sent from the sound input unit 10, the noise detecting unit 70 sends noise data to the noise memory unit 80. Also in this embodiment, processings 1 to 4, 5', 6, and 7 are the same as those of the embodiments shown in FIGS. 1 and 3. By referencing the noise data within the noise memory unit 80, the noise detecting unit 70 can detect a noise with ease. In this embodiment, the noise memory unit 80 automatically accumulates data on various noises simultaneously to the operation of the sound processing device 1. This exemplary embodiment eliminates the necessity of a particular operation of causing the noise memory unit 80 to store the noise data therein.

Figure 6:
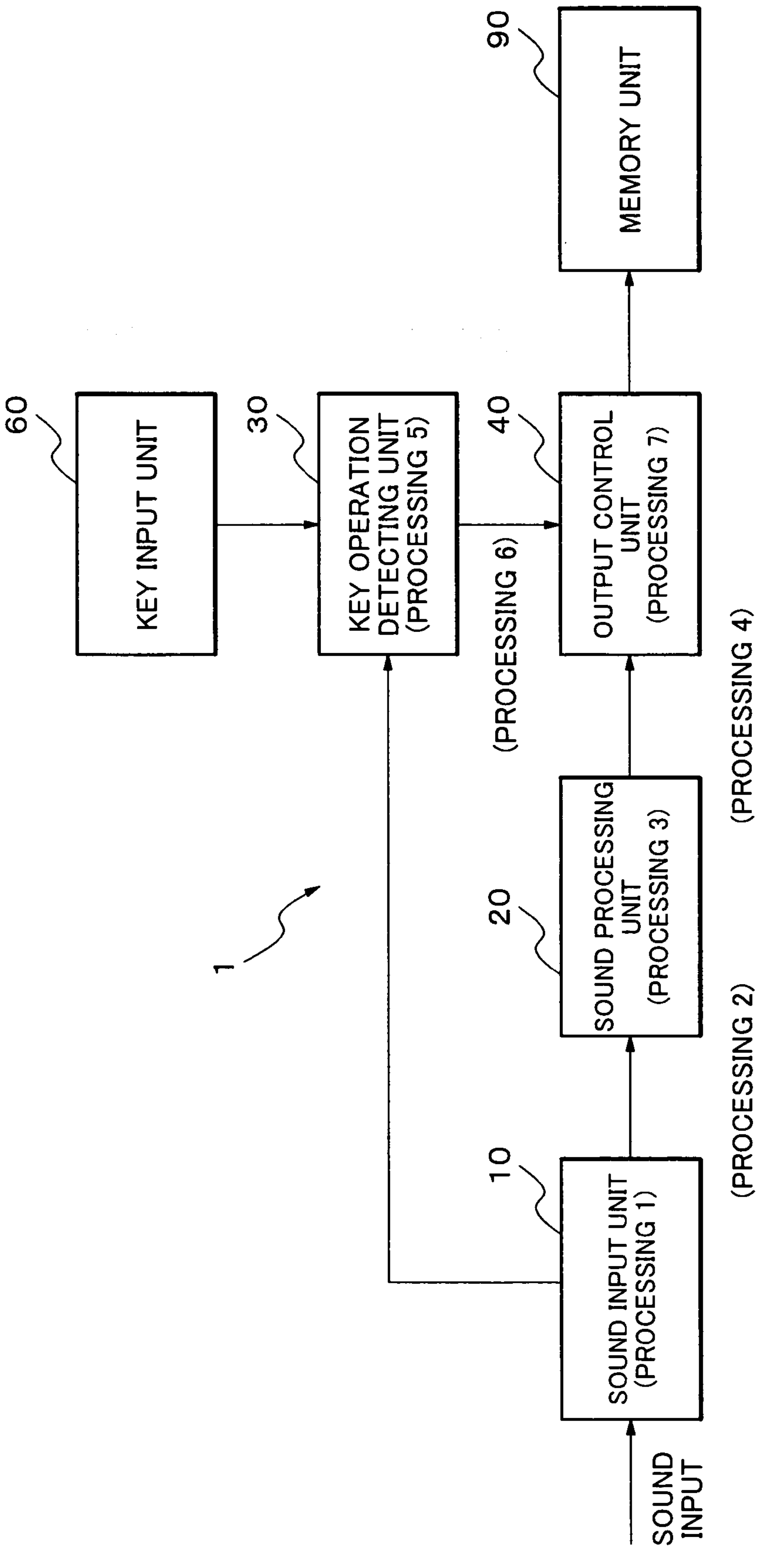
FIG. 6 shows a configurational example in which a sound processing device according to the present invention is applied to an audio recording device.

FIG. 6 shows an example in which the above-mentioned sound processing device 1 is applied to an audio recording device. The output control unit 40 of the sound processing device 1 shown in FIG. 1 outputs sound data to a memory unit 90 rather than to the communication unit 50. In this case, noise data (such as a key click sound) among the sound data is replaced with silent data. Also in this embodiment, processings 1 to 4, 5', 6, and 7 are the same as those of the above-mentioned embodiments.

The sound processing device 1 described above may include a control unit (not shown). The control unit may incorporate therein at least one of the sound input unit 10, the sound processing unit 20, the key operation detecting unit 30, the output control unit 40, the noise detecting unit 70, and the noise memory unit 80.

The present invention can be applied to a cellular phone, a radio communication device, an audio recording device, and the like.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

Further, it is the inventor's intent to retain all equivalents of the claimed invention even if the claims are amended during prosecution.

What is claimed is:

1. A sound processing device, which is incorporated into a device having key operation means, comprising:

input sound dividing means for dividing an input sound into predetermined time units;

input sound encoding means for encoding the input sound thus divided;

noise memory means for storing noise data;

noise detecting means for detecting a noise within the input sound in parallel with the input sound encoding; and output control means for replacing encoded data on the input sound with silent data according to detection results of the noise detecting means, wherein the noise detecting means references to the noise data stored within the noise memory means to detect the noise within the input sound, the noise data being obtained by collecting key click sounds by operating the key operation means.

2. The sound processing device according to claim 1, which is incorporated into an audio recording device.

3. The sound processing device according to claim 2, wherein the output control means sends data to memory means of the audio recording device.

4. The sound processing device according to claim 1, wherein the noise detecting means judges that the input sound contains noise upon detection of a key operation.

5. The sound processing device according to claim 1, wherein the noise detecting means is adapted to detect a noise within the input sound using a sound processing, and upon detection of a noise within the input sound, the noise detecting means outputs the noise to the noise memory means.

6. The sound processing device according to claim 1, which is incorporated into a portable communication terminal.

7. The sound processing device according to claim 6, wherein the output control means sends data to communication means of the portable communication terminal.

8. A sound processing device, which is incorporated into a device having a key operation unit, comprising:

a sound input unit configured to divide an input sound into predetermined time units;

a sound processing unit configured to encode the input sound thus divided;

a noise memory unit configured to store noise data;

a noise detecting unit configured to detect a noise within the input sound in parallel with the input sound encoding processing; and an output control unit configured to replace encoded data on the input sound with silent data according to detection results of the noise detecting unit, wherein the noise detecting unit references to the noise data stored within the noise memory unit to detect the noise within the input sound, the noise data being obtained by collecting key click sounds by operating the key operation unit.

9. The sound processing device according to claim 8, wherein the noise detecting unit judges that the input sound contains a noise upon detection of a key operation.

10. The sound processing device according to claim 2, wherein the noise detecting unit is adapted to detect a noise within the input sound using a sound process, and upon detection of a noise within the input sound, the noise detecting unit outputs the noise to the noise memory unit.

11. The sound processing device according to claim 8, which is incorporated into a portable communication terminal.

12. The sound processing device according to claim 11, wherein the output control unit sends data to a communication unit of the portable communication terminal.

13. The sound processing device according to claim 8, which is incorporated into an audio recording device.

14. The sound processing device according to claim 13, wherein the output control unit sends data to a memory unit of the audio recording device.

15. An input sound processing method adapted for use in a device having a key operation unit, comprising:

encoding an input sound;

storing noise data in a memory;

judging whether or not the input sound contains a noise, wherein the encoding of an input sound and the judging as to whether or not the input sound contains a noise are executed in parallel; and replacing a noise portion contained in the encoded input sound with silent data, wherein the judging as to whether or not the input sound contains a noise is executed by referencing to the stored noise data, the noise data being obtained by collecting key click sounds by operating the key operation unit.

16. The input sound processing method according to claim 15, wherein, upon reception of a notification of a key operation, the input sound is judged to contain a noise.

17. The method according to claim 15, further comprising:

detecting a noise within the input sound using a sound processing; and outputting, upon detection of a noise within the input sound, the noise to the memory.

18. A computer program product in a computer readable medium for use in a sound processing device having a key operation unit, the computer program product comprising the steps of:

encoding an input sound;

storing noise data;

judging whether or not the input sound contains a noise, wherein the encoding of an input sound and the judging as to whether are or not the input sound contains a noise are executed in parallel; and replacing a noise portion contained in the encoded input sound with silent data, wherein the judging as to whether or not the input sound contains a noise is executed by referencing to the stored noise data, the noise data being obtained by collecting key click sounds by operating the key operation unit.

19. The computer program product according to claim 18, further comprising the step of detecting a key operation, wherein, upon detection of a key operation, the input sound is judged to contain noise.

20. The computer program product according to claim 18, further comprising the steps of:

detecting a noise within the input sound using a sound processing; and outputting the noise, upon detection of a noise within the input sound.

* * * * *